United States Patent
Seal et al.

(10) Patent No.: US 7,805,336 B2
(45) Date of Patent: *Sep. 28, 2010

(54) ANONYMOUS DELIVERY OF DIGITAL PRODUCTS OVER A NETWORK VIA A LINK

(75) Inventors: Krishanu Seal, New Delhi (IN);
Hilliard B. Siegel, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 1051 days.

This patent is subject to a terminal disclaimer.

(21) Appl. No.: 11/531,184

(22) Filed: Sep. 12, 2006

(65) Prior Publication Data

US 2007/0027781 A1 Feb. 1, 2007

Related U.S. Application Data

(63) Continuation of application No. 09/815,450, filed on Mar. 22, 2001, now Pat. No. 7,117,167.

(51) Int. Cl.
*G06Q 30/00* (2006.01)
(52) U.S. Cl. ............................. 705/26; 705/27
(58) Field of Classification Search ............... 705/26
See application file for complete search history.

(56) References Cited

U.S. PATENT DOCUMENTS

| | | |
|---|---|---|
| 5,708,780 A | 1/1998 | Levergood et al. |
| 5,715,314 A | 2/1998 | Payne et al. |
| 5,790,677 A | 8/1998 | Fox et al. |
| 5,815,665 A | 9/1998 | Teper et al. |
| 5,895,454 A | 4/1999 | Harrington |
| 5,897,622 A | 4/1999 | Blinn et al. |
| 5,970,472 A | 10/1999 | Allsop et al. |
| 5,970,475 A | 10/1999 | Barnes et al. |
| 6,175,823 B1 | 1/2001 | Van Dusen |
| 6,192,407 B1 | 2/2001 | Smith et al. |

(Continued)

FOREIGN PATENT DOCUMENTS

WO  0300527 A1  1/2003

OTHER PUBLICATIONS

Walker, Leslie: "Cloaking Devices Designed for Wary Web Shoppers," The Washington Post [Final Edition], Washington DC, Oct. 19, 2000, p. E01 (of record in parent application).

(Continued)

*Primary Examiner*—Bradley Bayat
(74) *Attorney, Agent, or Firm*—Knobbe, Martens, Olson & Bear LLP

(57) ABSTRACT

Processes and systems are disclosed for enabling a user to purchase a digital product from a first computer system (e.g., a merchant web site), and to then initiate electronic delivery of the digital product from a second computer system without revealing personal information to the second computer system or its operator. In one embodiment, the user initiates the anonymous delivery from the second computer system using a link received from the first computer system. The first and second computer systems communicate with each other to track fulfillment/delivery statuses of orders, and to limit the number of times the user can download the purchased digital product from the second computer system.

31 Claims, 11 Drawing Sheets

U.S. PATENT DOCUMENTS

| | | |
|---|---|---|
| 6,332,134 B1 | 12/2001 | Foster |
| 6,360,254 B1 | 3/2002 | Linden et al. |
| 6,363,357 B1 | 3/2002 | Rosenberg et al. |
| 6,456,234 B1 * | 9/2002 | Johnson ................. 342/357.09 |
| 6,484,150 B1 | 11/2002 | Blinn et al. |
| 6,496,802 B1 | 12/2002 | van Zoest et al. |
| 6,598,026 B1 | 7/2003 | Ojha et al. |
| 6,970,849 B1 | 11/2005 | DeMello et al. |
| 6,981,262 B1 | 12/2005 | DeMello et al. |
| 7,117,167 B2 * | 10/2006 | Seal et al. ..................... 705/26 |
| 2002/0116531 A1 * | 8/2002 | Chu .......................... 709/246 |

OTHER PUBLICATIONS

Bellare, Mihir, et al., "iKP—A Family Secure Electronic Payment Protocols," Aug. 2, 1995 (of record in parent application).

Cox, Benjamin, et al., "NetBill Security and Transaction Protocol," Proceedings of the First USENIX Workshop on Electronic Commerce, Jul. 1995 (of record in parent application).

Gifford, David K., et al., "Payment Switches for Open Networks," Proceedings of the First USENIX Workshop on Electronic Commerce, Jul. 1995 (of record in parent application).

Keller, Arthur M., "Smart Catalogs and Virtual Catalogs," Proceedings of the First USENIX Workshop on Electronic Commerce, Jul. 1995 (of record in parent application).

* cited by examiner

Subject: Digital Products Receipt
From: orders@ecommerce_store.com
Date: Fri, 5 Jan 2001 18:10:00-0600
To: customer@isp.net Thank you for your order from ecommerce_store This email will allow you to acess the digital products that
you have ordered. Please click on the URL below in order to
go to the receipt page for your order.

You will be able to select each product you have purchased and
have it delivered to you.

http://www.ecommerce_store.com/drm/Haillx854ddC0klrcDJnnyTkoPQA

If you have any problems or concerns with this, please e-mail us at:
order@ecommerce_store.com or call us at:

(515) 555-1235

235 W. Main Street
Suite 110
Anytown, CA 99999
USA

Thank you for your continued support
ecommerce_store.com

*FIG. 9*

ANONYMOUS DELIVERY OF DIGITAL PRODUCTS OVER A NETWORK VIA A LINK

PRIORITY CLAIM

This application is a continuation of U.S. application Ser. No. 09/815,450, filed Mar. 22, 2001, now U.S. Pat. No. 7,117, 167 the disclosure of which is hereby incorporated by reference.

BACKGROUND OF THE INVENTION

1. Field of the Invention

This invention relates generally to the processing of transactions over a computer network such as the Internet and, more particular, to the delivery of digital goods or services to customers by Internet vendors without the vendor knowing the identity of the customer.

2. Description of the Related Art

It is now commonplace for consumers to purchase goods or services from on-line or e-commerce retailers. A large number of retailers have set up sites where consumers can peruse the products that are available for sale, purchase the good, or goods, in question and have the product delivered to them. Although these goods are often tangible goods, substantial traffic in digital goods, such as electronic books, music, or application software is increasing.

The electronic good may be delivered directly from the on-line merchant's computer system. However this requires the on-line merchant to maintain a copy of the digital goods that it wants to sell. If a single on-line merchant is selling the electronic products of a number of vendors of electronic content, then the merchant is typically required to inventory and manage a large amount of material for each vendor.

A second option is to redirect the customer, after his or her purchase, to a computer server maintained by the vendor. The customer can then follow the instructions at the web site of the vendor to download the product. The customer must identify himself or herself, or present some form of credential to download the purchased product. This additional step requires the customer to expose his or her identity to the vendor and to follow the particular details of the download process that that vendor utilizes. This becomes especially complicated when the customer has purchased goods that are provided by a multiplicity of vendors. The user interface and experience at each site is likely to be different, increasing the likelihood of customer confusion and greatly diminishing the on-line shopping experience. Further, placing the onus on the customer to get the product from the vendor increases the likelihood that the customer will later look to the vendor, rather than the merchant, as the source of these types of products.

If an authentication or authorization credential is given to the customer to allow him or her to request delivery of the product, attempts to steal or intercept the credential prior to its use by the legitimate customer are possible. This approach also requires the vendor to have a mechanism to prevent the re-use of credentials and to manage the access and credential verification of customers.

More preferable would be a system whereby the customer, after the purchase, may gain access to products maintained by one or more vendors without inconveniencing the customer, forcing him or her to reveal his or her identity, or putting the security of the transaction at risk, while maintaining the continuity of the shopping experience.

SUMMARY OF THE INVENTION

The invention provides a system and associated methods that allow a customer to purchase a digital product from a merchant, and then receive the product over a computer network from a vendor of the product, without revealing the customer's identity or other personal information to the vendor. Further, in some embodiments, the invention allows the merchant to maintain a common user purchase experience for a plurality of vendors, further enhancing the ease of the on-line shopping experience for the customer.

In a preferred embodiment, when a customer purchases a digital product from the on-line merchant, the merchant, through its computer system, creates an order record and order receipt for the transaction, and conveys the order receipt to the customer's computer. The order receipt contains the information used by the customer to request delivery of the product or products. In one embodiment, the conveyance of the order receipt from the merchant to the customer is via an email message. The email message contains a Uniform Resource Locator (URL) tag that allows the customer to bring up a web page containing a list of the products ordered and, optionally, other information, such as order status information. The customer then selects the product to be delivered and the merchant issues a series of electronic requests to the vendor to initiate delivery of the product to the customer. After completion of delivery of the product to the customer, the vendor, through it's order processing system, notifies the merchant of the fulfillment of the delivery request and the merchant updates the order record to indicate that the product has been delivered.

In some embodiments of the invention, specific steps are taken to ensure that the entire receipt delivery, delivery request, and delivery processes are robust, secure, and present a simple and uniform shopping experience for the customer. The URL in the order receipt contains information that identifies the order. This information is strongly encrypted and encoded prior to its transport to the customer. This allows the merchant to trust the validity of a request when it is received, and inhibits or prevents third parties from obtaining delivery of items that others ordered.

In a preferred embodiment, when the customer uses the URL to access order information, the customer is presented with a list of the products that have been purchased but not yet downloaded. The customer may then select one of these products for delivery. The merchant then creates a secure hash made up of the relevant product and order information, such as the order ID, the item ID, the instance ID, the date, the time, etc. The merchant then sends this hash to the vendor. In some embodiments, this secure hash may be included in the original URL sent to the customer; and therefore does not need to be generated upon access by the customer. This also allows for the customer to directly access the vendor's order server, rather than going through the merchant.

Upon receipt of the request containing the hash, either from the customer or the merchant, the vendor de-hashes the secure hash to recover the order information inside it. Some types of products or configuration of vender order processors may require the merchant to send multiple communications to the vendor. This is often the case when the vendor's order processor has been designed assuming that the access will come from an interactive user. In these cases, the merchant emulates the actions of the customer in order to initiate the product delivery. In this manner, the details of the implementation of the order processor are hidden from the customer, making the experience similar without regard to the peculiarities of the implementations of particular vendors.

The vendor's order processor then initiates the delivery of the digital product to the customer. Upon completion of this delivery, the vendor system notifies the merchant of the successful fulfillment of the delivery request and the vendor records the fulfillment, preventing future access to that item in the customer's order.

For purposes of summarizing the invention, certain aspects, advantages and novel features of the invention have been described herein above. It is to be understood, however, that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

These and other features will now be described with reference to the drawings summarized below. These drawings and the associated description are provided to illustrate embodiments of the invention, and not to limit the scope of the invention.

FIG. 9 illustrates an email message sent from the merchant to the customer in accordance with the preferred embodiment of the invention.

DETAILED DESCRIPTION OF THE PREFERRED EMBODIMENT

In the following description, reference is made to the accompanying drawings, Which show, by way of illustration, specific embodiments in which the invention may be practiced. Numerous specific details of these embodiments are set forth in order to provide a thorough understanding of the present invention. However, it will be obvious to one skilled in the art that the present invention may be practiced without the specific details or with certain alternative components and methods to those described herein. In other instances, well-known methods, procedures, and components have not been described in detail so as not to unnecessarily obscure aspects of the present invention.

Except where explicitly or implicitly indicated otherwise, the terms "merchant" and "vendor" refer to computer systems operated or controlled by a merchant or a vendor, respectively. Thus, process steps described as being performed by the "merchant" or the "vendor" are preferably automated steps performed by their respective computer systems. These steps are preferably implemented within software modules (programs) executed by one or more general purpose computers. Specially designed hardware could alternatively be used to perform certain operations. Process steps described as being performed by a "customer" are typically performed by a human operator via an appropriate computing device, but could, alternatively, be performed by an automated agent.

Figure 1:
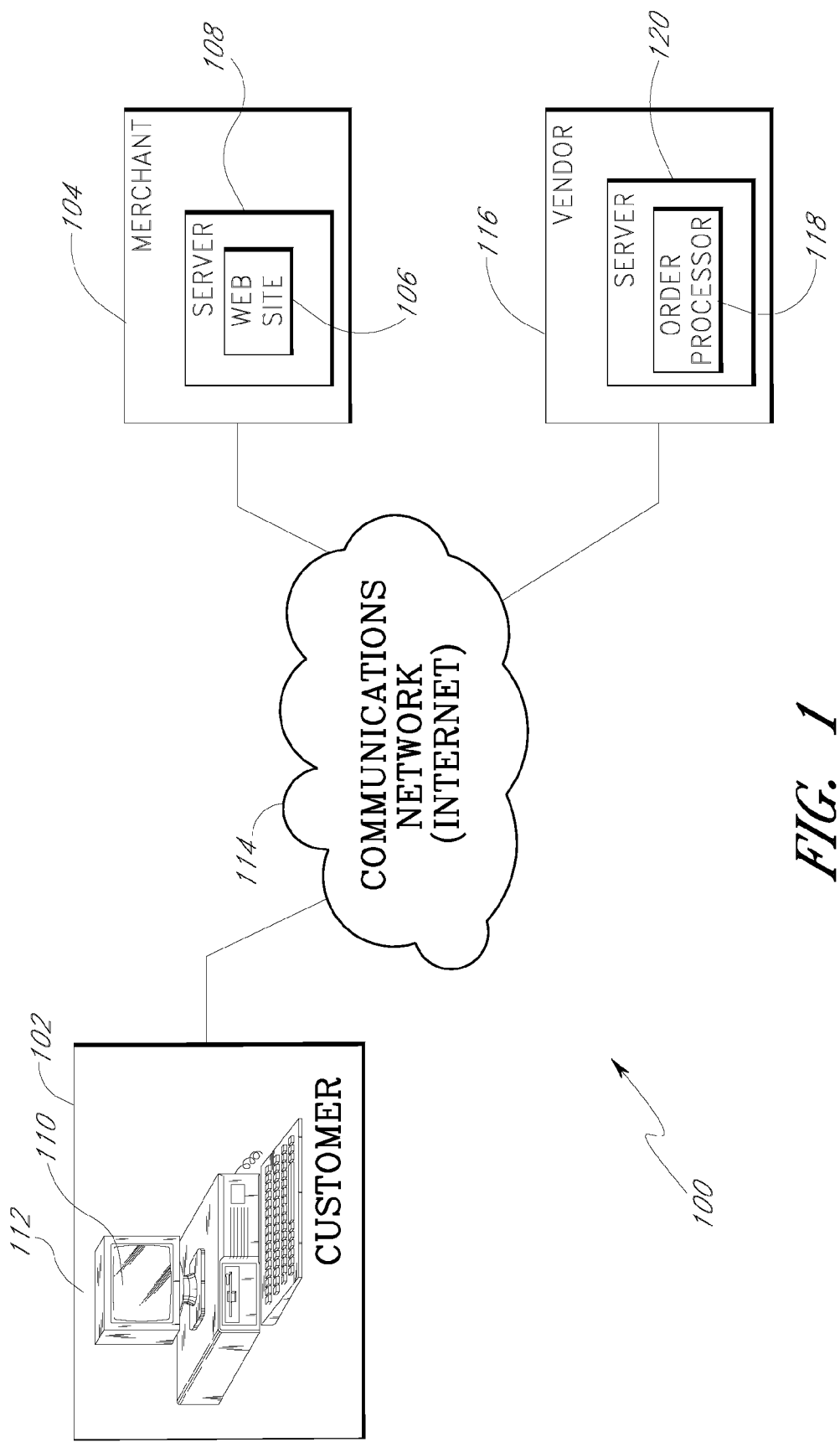
FIG. 1 illustrates the principle components of a preferred embodiment of a system for anonymous delivery of digital goods.
Figure 2:
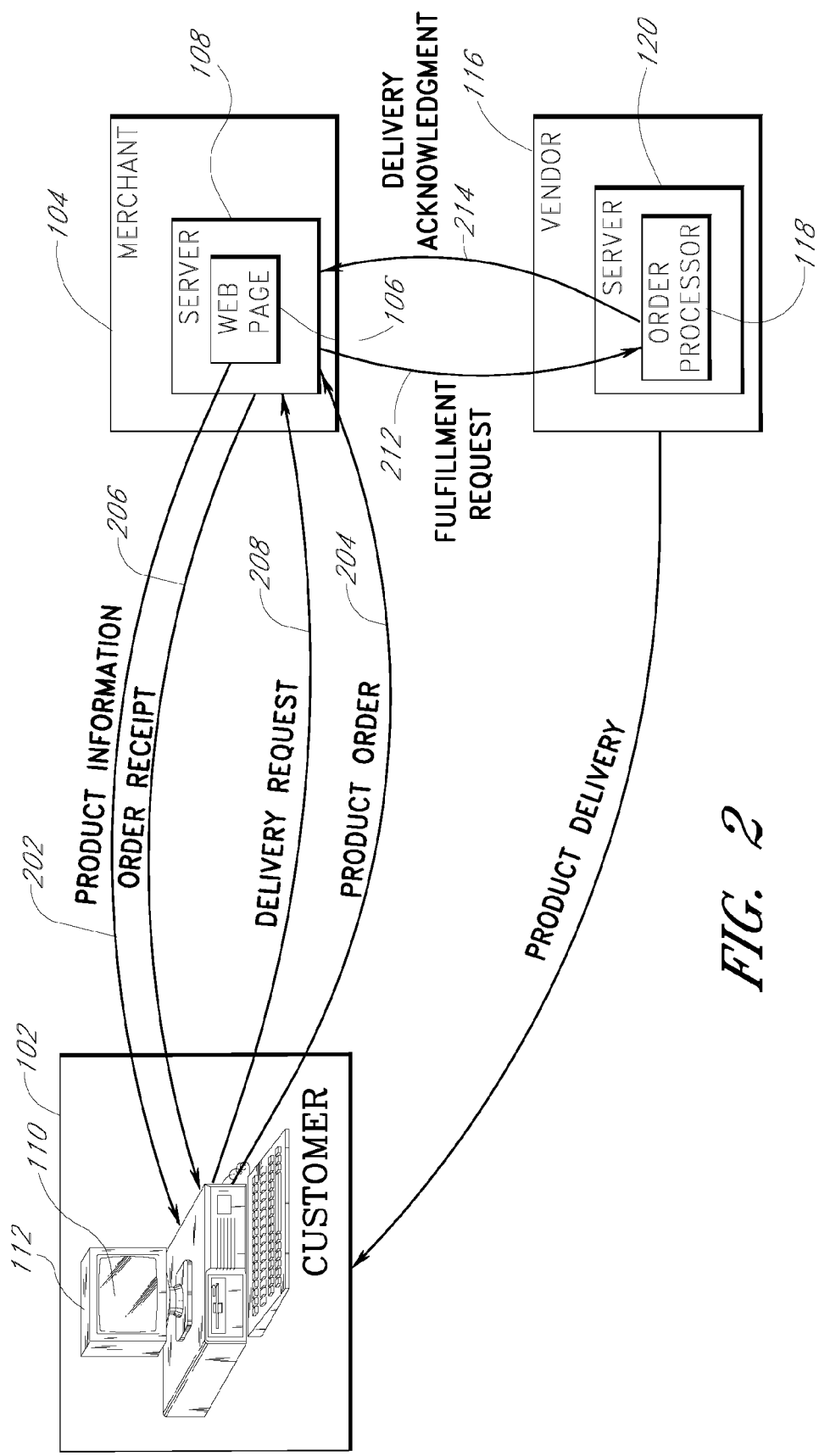
FIG. 2 illustrates a data flow diagram showing the transfer of information between a customer, an on-line merchant, and an on-line vendor in the preferred embodiment of the system.

FIG. 1 illustrates the principal components of the preferred embodiment of a digital product delivery system 100, while FIG. 2 illustrates the data flow in the digital product delivery system. A customer 102 can be any entity or individual that wishes to purchase goods or services from an on-line merchant 104. The merchant 104 is preferably an entity that sells products or services from a merchant web site 106, which is implemented using one or more physical servers 108. The customer 102 preferably uses a web browser 110 running on a computer 112. The computer is connected to the merchant server through a communications network 114, preferably the Internet.

In order to make purchases, the customer 102 typically browses through product information 202 concerning products available for purchase from the on-line merchant 104. After selecting a product or products that the customer 102 wishes to purchase, a product order 204 is sent to the merchant 104. The product order 204 is preferably placed via a communication from the web browser 110 to the web site 106 operating on a server 108 maintained by the merchant 104. The customer 102 typically provides to the merchant 104 the customer's personal information, which includes identifying information and purchase information such as name, address phone number, and credit card information.

After the product order 204 is placed, the merchant 104 provides an order receipt 206 to the customer 102. The customer 102 then uses the order receipt 206 to issue a delivery request 208, preferably to the merchant 104 (i.e., the merchant's computer system 108). In some embodiments, the delivery request is alternatively transmitted to the vendor 116. This delivery request 208 triggers product delivery 210.

The ordered product is not provided by the merchant 104, but, preferably, by a third party vendor 116. The product delivery 210 is made to the customer via the communications network 114 from the vendor 116, and is performed in response to a fulfillment request 212 sent from the merchant 104 to an order processor 118. Preferably following, but in some embodiments concurrent to, the product delivery 210, the vendor 116 provides a delivery acknowledgement 214 to the merchant 104.

Figure 3:
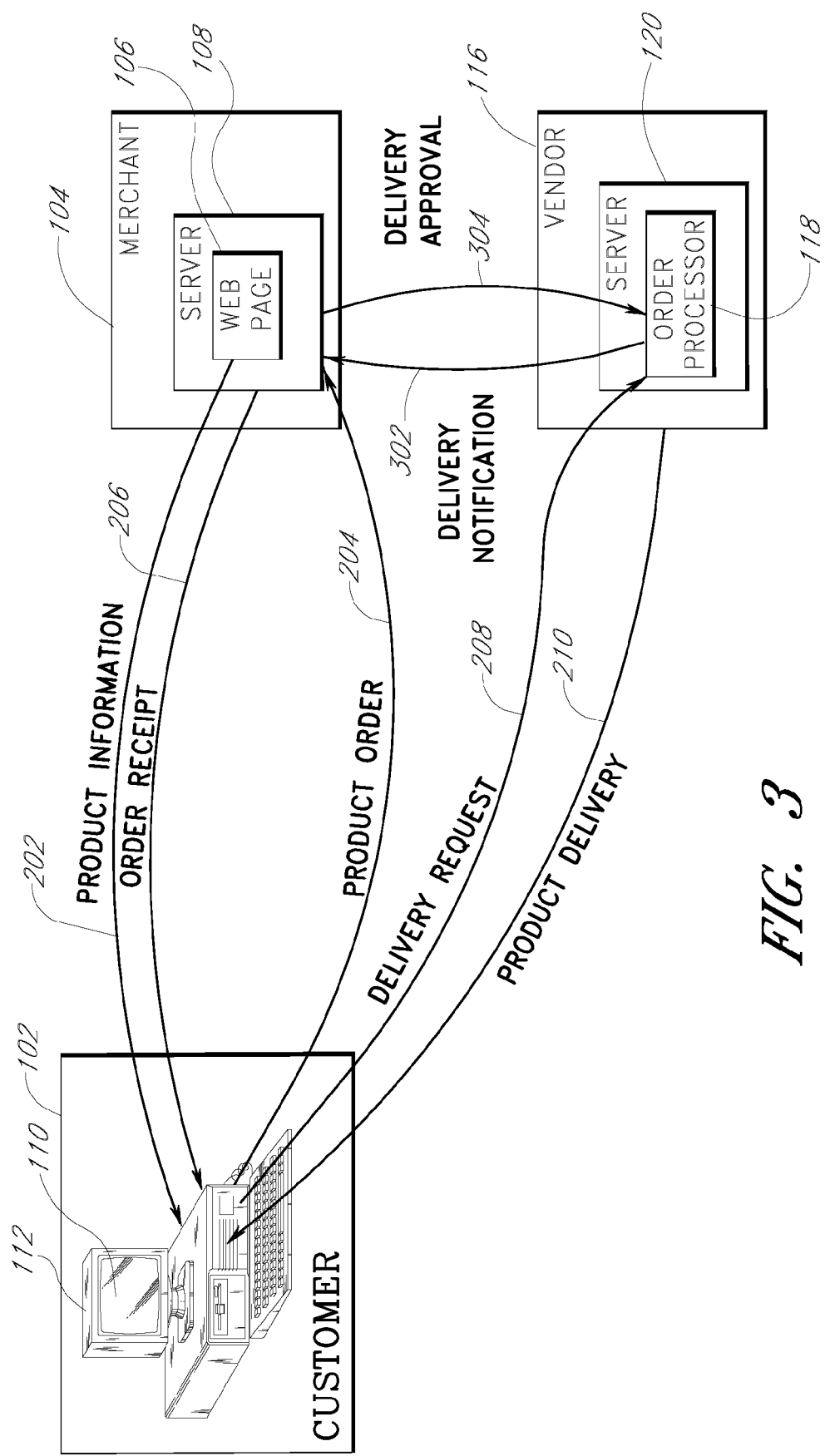
FIG. 3 illustrates a data flow diagram showing the transfer of information between a customer, an on-line merchant, and an on-line vendor in a first alternate embodiment of the system.

The flow of data in an alternative embodiment of the system is shown in FIG. 3. In this embodiment, the information in the order receipt 206 allows the customer 102 to issue the delivery request 208 for the product delivery 210 to the vendor 116, rather than to the merchant 104 as in the preferred embodiment. In response to this delivery request 208, the vendor 116 issues a delivery notification 302 to the merchant 104. In response, if the delivery request 208 is valid, the merchant 104 sends a delivery approval 304 to the vendor 116 resulting in product delivery 210 from the vendor 116 to the customer/customer computer.

Figure 4:
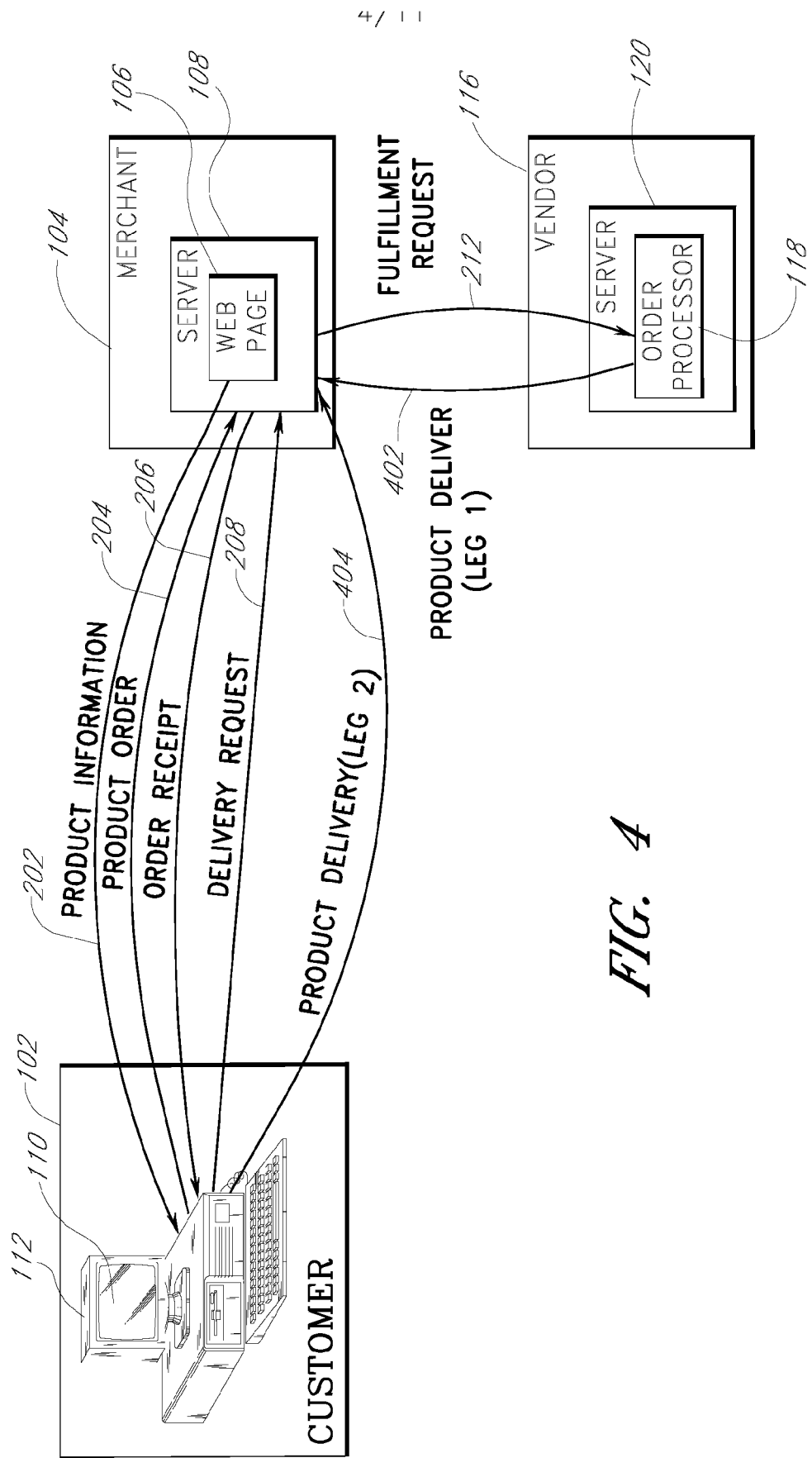
FIG. 4 illustrates a data flow diagram showing the transfer of information between a customer, an on-line merchant, and an on-line vendor in a second alternate embodiment of the system.

The flow of data in a second alternative embodiment is shown in FIG. 4. In this embodiment, all data flow is as in the preferred embodiment, except for the product delivery 402, 404. In this embodiment, the product delivery from the vendor 116 to the customer 102 is performed in two legs or stages, via the merchant 104. Initially, the vendor 116 directs the first leg of the delivery 402 of the product to the merchant 104, and the merchant 104 then re-directs the second leg of the delivery 404 to the customer 102. As will be apparent to one skilled in the art, aspects of this embodiment may be combined with aspects of the first alternative embodiment to produce additional alternative embodiments.

Figure 5:
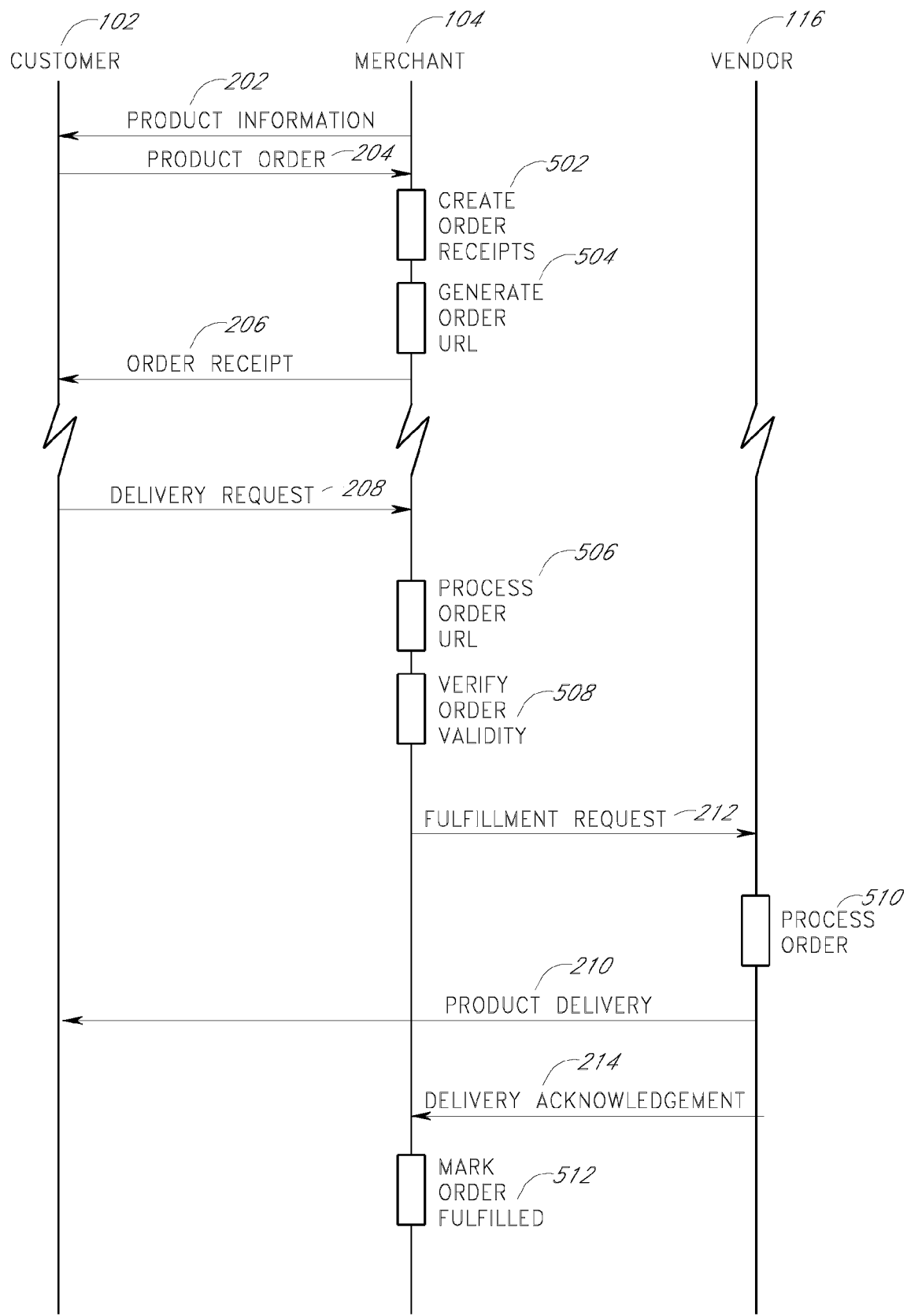
FIG. 5 is a sequence diagram showing, generally, the preferred embodiment of the system.

FIG. 5 illustrates the general process associated with the preferred embodiment of the invention depicted in FIG. 2. The merchant displays product information 202 to the customer 102. The customer 102 places a product order 204 with the merchant 104. In response to the product order 204, the merchant 104 creates an order receipt 502 corresponding to the product order 204. The merchant 104 also generates an order URL (Uniform Resource Locator) 504 which contains information, securely encrypted and encoded, identifying the particular product order 204 which caused its creation. This order URL is then sent to the customer 102, preferably as part of a hyperlink within an order receipt 206.

At some later time, the customer 102 generates a request for the order URL that is part of the order receipt 206, such as by selecting the hyperlink. This URL request message represents the illustrated delivery request 208. The merchant then processes the order URL 506 in order to determine the product order 204 to which it corresponds. This is performed by decoding and decrypting a portion of the URL to determine the order receipt ID. The merchant then verifies the validity of the order 508. This validity check confirms that the order is valid and that it has not yet been fulfilled. If the delivery request 208 is valid, then a fulfillment request 212 is issued to the vendor 116.

The fulfillment request 212 preferably includes only the information that is necessary to allow the vendor 116 to complete product delivery 210. This information may include the delivery address, e.g., the IP (Internet Protocol) address of the customer, as well as the product ID. The fulfillment request does not provide any of the customer's personal information such as customer name, email address, residence address, etc. In addition, the fulfillment request does not include other transaction information about the purchase such as method of payment or other identities of products purchased. Thus customer's privacy is therefore preserved.

The vendor 116 processes 510 the fulfillment request 212 and fulfills the order by effecting product delivery 210. After successful product delivery 210 to the customer's computer, the vendor issues a delivery acknowledgement 214 to the merchant 104, and the merchant marks the order as fulfilled 512. Once the order has been marked as fulfilled, the vendor may inhibit, or limit a number of, future downloads of the product by the consumer.

Figure 6:
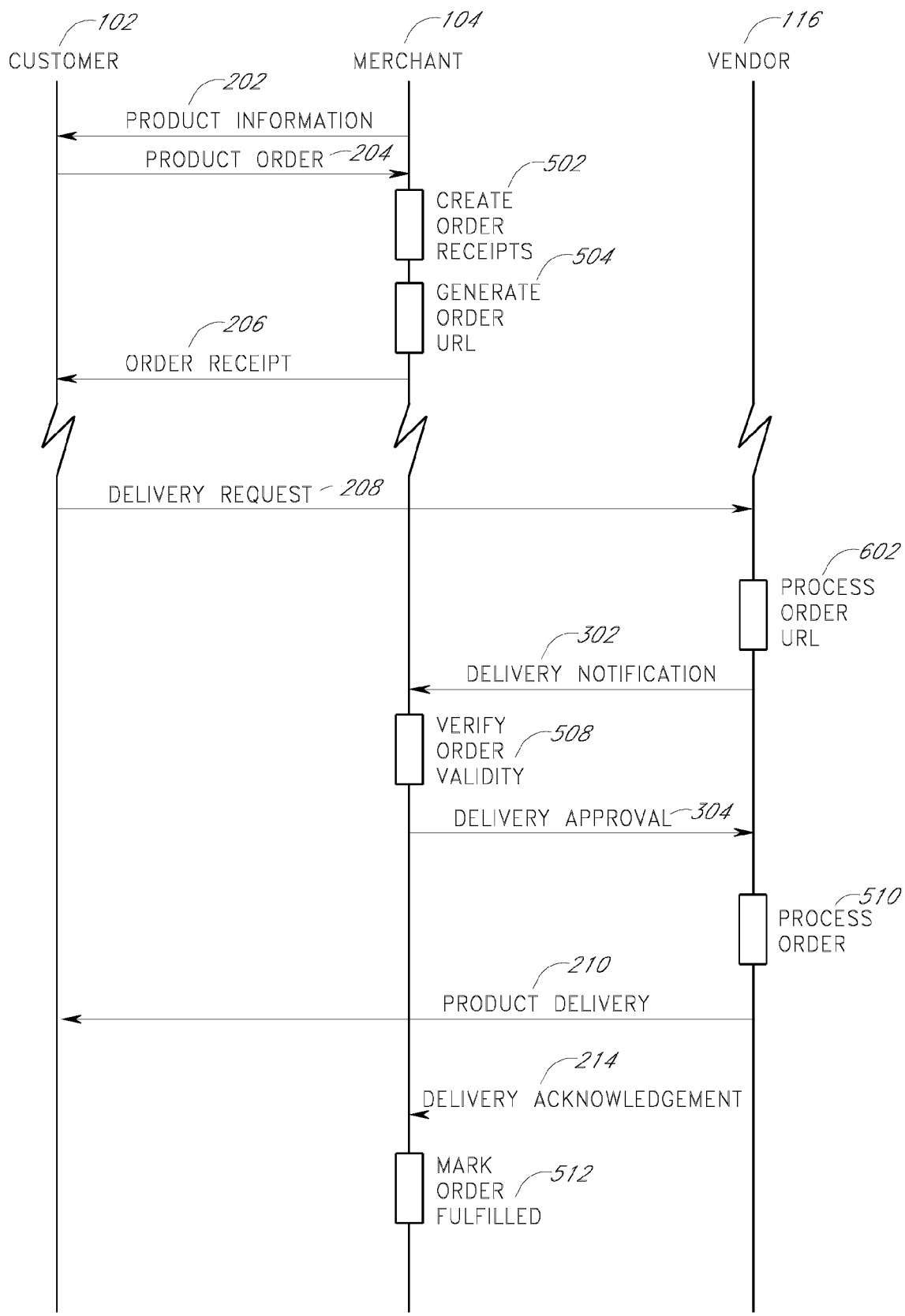
FIG. 6 is a sequence diagram showing, generally, the first alternative embodiment of the system.

FIG. 6 illustrates the general process corresponding to a first alternative embodiment, depicted in FIG. 3. In this embodiment, the delivery request 208 from the customer 102 goes directly to the vendor 116, and the vendor 116 processes the order URL 602. This order URL contains sufficient information, such as the receipt ID and product information, that the vendor 116 can determine what product is desired and provide a meaningful delivery notification 302 to the merchant 104. The delivery notification 304 contains enough information, e.g. the receipt ID and an ID of the product desired, so that the merchant 104 can verify the order validity 508. Preferably, the merchant will determine at least whether the particular product has been paid for, and whether (or how many times) the product has been delivered to the customer. If the merchant 104 determines that the product has been purchased and not previously delivered (or delivered less than a threshold number of times), then the merchant 104 will issue a delivery approval 304 to the vendor 116. It is possible, in alternate embodiments, for the initial delivery notification 302 to contain only the receipt ID and for all additional information needed to deliver the correct product to the customer 102 to come from the merchant 104 in the delivery approval 304. Upon receiving the delivery approval 304, the vendor 116 will process the order 510 and make the product delivery 210. Upon completion of the product delivery 210, the vendor 116 issues a delivery acknowledgement 214 to the merchant 104 and the order is marked as fulfilled 512. In this embodiment of the invention the vendor 116 to configures its order processor 118 so that it behaves in the same manner as the merchant's server 108 behaved in the preferred embodiment. The order processor 118 of the vendor 116 is also configured to interface with software on the merchant server 108 that handles validation and verification of the order.

Figure 7:
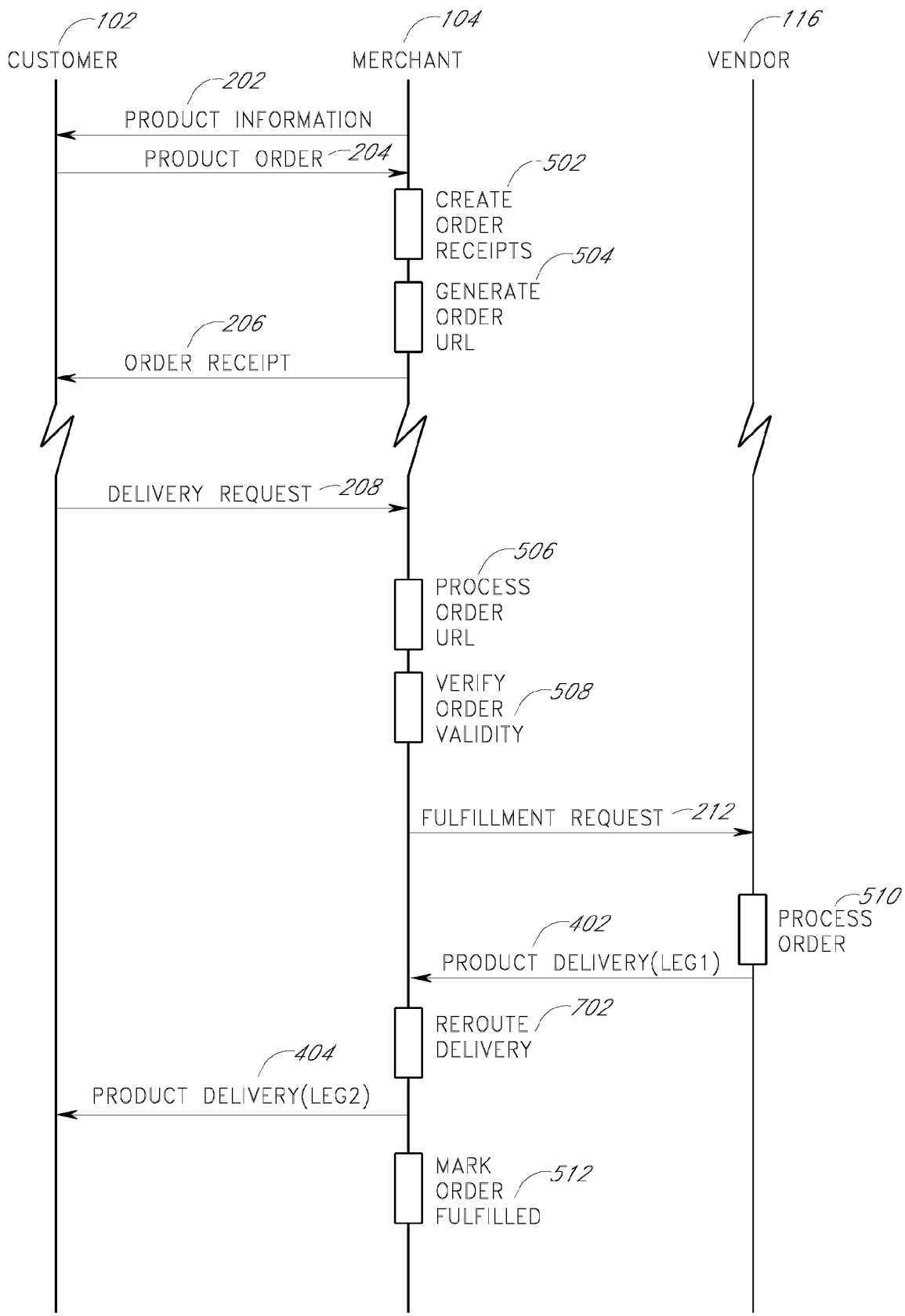
FIG. 7 is a sequence diagram showing, generally, the second alternative embodiment of the system.

FIG. 7 illustrates the general process involved in the second alternative embodiment of the invention, depicted in FIG. 4. The steps of this process are substantially the same as in the preferred embodiment except for those dealing with delivery of the product from the vendor to the customer 402, 404. Rather than directly delivering the product to the customer in a single delivery leg, as in the preferred embodiment, the delivery is effected with two delivery legs. The vendor 116 initially directs the delivery of the product to the merchant 104 in a first delivery leg 701, and the merchant redirects the delivery to the customer in a second delivery leg 702. The redirection of delivery may be performed by forwarding by the merchant 104 of the delivery received from the vendor 116 to the customer 102. The first leg of the product delivery 402 contains sufficient information for the merchant 104 to reroute the delivery 702. This information may include complete final destination information, but is more likely to simply include an identifier that designates the order receipt to which this product delivery 402 corresponds. In this manner, all information about the customer 102, including the delivery address of the customer 102 may be hidden from the vendor 116.

Figure 8A:
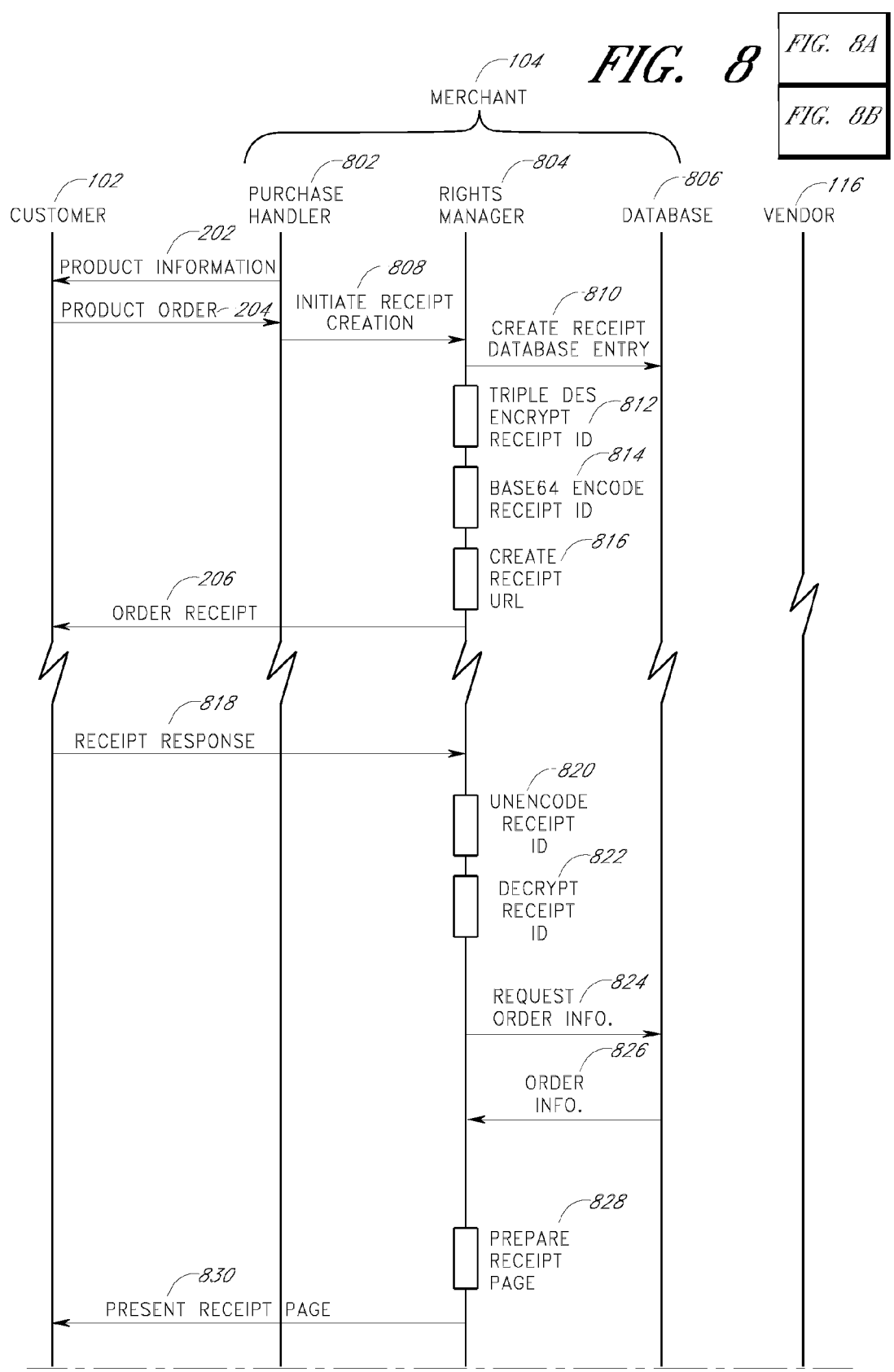
FIGS. 8A-B are a sequence diagram illustrating, in more detail, a process by which the system allows the delivery, by an on-line vendor, of digital products, purchased from a merchant, to a customer, in accordance with the first specific embodiment of the system.
Figure 8B:
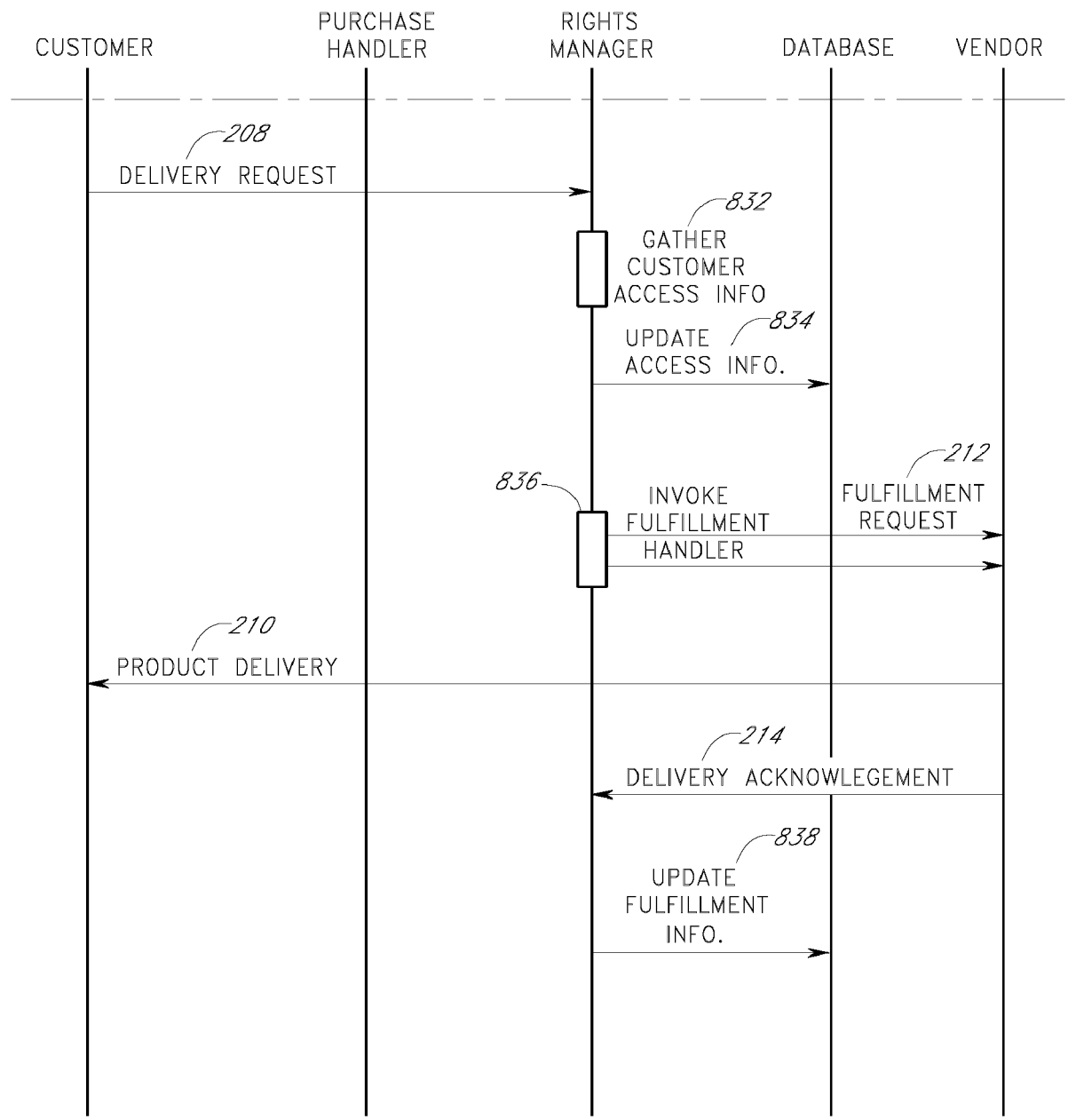

FIGS. 8A-B illustrate a more detailed sequence flow of the preferred embodiment of the invention (previously illustrated in FIGS. 1, 2, and 5) involving the activities of a purchase handler 802, rights manager 804, and database 806 operated by the merchant 104. The merchant purchase handler 802 provides the product information 202 to the customer 102 and receives the product order 204 from the customer 102. The purchase handler then initiates the creation of a receipt 808 by the rights manager 804. The rights manager creates a receipt database entry 810, which preferably contains all the information that may be used at a later date for processing or tracking the purchase. This may include the customer 102 name, address, and purchase information, as well as the details of the order including product ordered, quantity, price, and other characteristics. The rights manager 804 then Triple DES encrypts the receipt ID 812 and BASE64 encodes it 814. Other encryption and encoding schemes may be substituted for Triple DES and Base64. The rights manager 804 creates a receipt URL 816 based on the encrypted and encoded receipt ID. This URL is then included in a mail message, such as shown in FIG. 9, and sent to the customer 102 as the order receipt 206. The order receipt 206 may alternatively be in the form of a web page. In the example shown in FIG. 9, the string following the last forward slash of the URL is the encrypted and encoded receipt ID.

Figure 10:
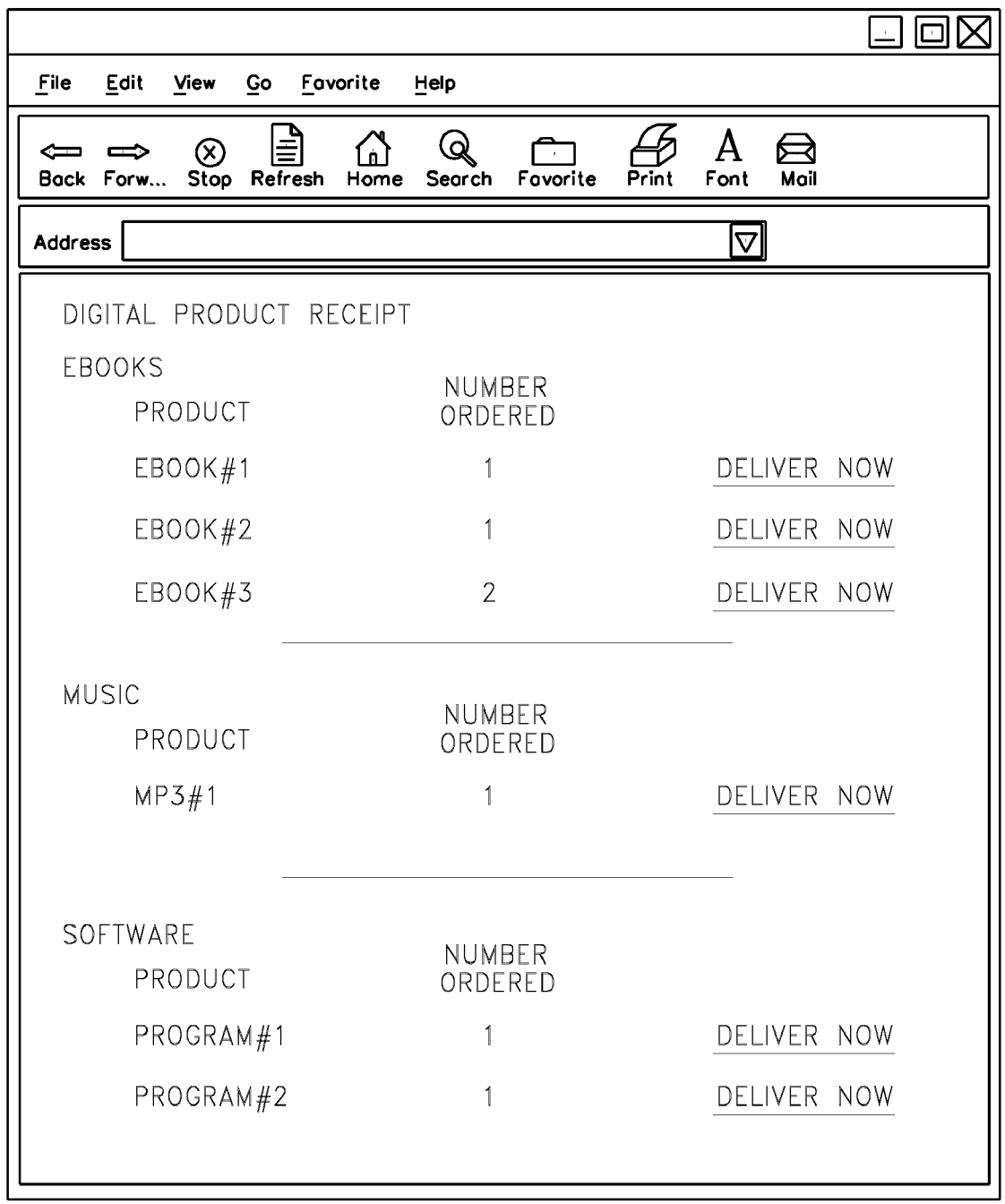
FIG. 10 illustrates a Digital Product Receipt web page in accordance with the preferred embodiment of the invention.

When the customer 102 decides to initiate delivery of the products ordered he or she can provide a receipt response 818, by accessing the receipt URL that was sent in the order receipt. This is preferably done using a web browser 110 operating on the customer's 102 computer 112. As shown in FIG. 8A, when the customer 102 accesses this URL the rights manager 804 decodes the receipt ID 820, and decrypts the receipt ID 822 based on the secret key used to previously encrypt the receipt ID 812. The rights manager 804 requests the order information 824 from the database 806 and prepares a receipt page 828 based on the order information 826 returned from the database 806. This receipt page is preferably an HTML document which contains a list of the products ordered and other information relating to the product order including the number of products ordered. For each listed product, the receipt page also includes an HTML link that can be selected to access the product. An example of such a receipt page is shown in FIG. 10. The receipt page is presented 830 to the customer 102.

The customer may issue a delivery request 208 for one or more products by clicking on the link on the receipt page. The rights manager 804 will then gather customer access information 832. This may include the IP address from which the customer is requesting delivery, as well as the browser ID, and other access related information. The rights manager 804 will then update the access information in the database 806.

The rights manager 804 will then instigate the handling of the fulfillment of the delivery request 836. The detailed interaction between the rights manager 804 and the vendor 116 will vary based upon the manner in which the vendor's order processor 118 is configured. The fulfillment request 212 may be a simple redirect of the HTTP request from the customer to the vendor, or may be a series of requests and actions that simulate the access of an interactive user. In this manner it is possible for the product delivery system to provide the same user interface and experience to the customer 102, for different instantiations of the vendor side order processor 118. This is done in the preferred embodiment by the creation of different fulfillment handlers 836 corresponding to the different vendors 116 that work with the merchant 104. In some instantiations of the fulfillment handler 836, the fulfillment handler will authenticate the customer 102 as a valid customer and transfer the customer 102 to the vendor's order processor 118. For other vendors, the invoked fulfillment handler 836 initiates the product delivery 210 to the customer 102. The vendor's order processor 118 is given a secure hash of information, including the product to be delivered, and the customer address for delivery, as well as other information. This then allows the vendor 116 to complete the product delivery. The actions of the fulfillment handler 836 may cause the vendor 116 to directly deliver the product to the customer 102 for some types of product interfaces and to send the product to the merchant 104 for redirection or forwarding to the customer 102. The choice of which to do is preferably made so as to maintain a simple and uniform an interface and shopping experience for the customer 102. In this manner a single embodiment of the delivery system may exhibit data flows as in FIGS. 2 and 4.

Upon completion of product delivery, 210 the rights manager 804 relies on positive feedback of delivery acknowledgement 214 from the vendor 116. Based upon this feedback, the rights manager 804 updates the fulfillment information 838 in the database 806. The rights manager 804 has information about attempted fulfillment from the invocation of the fulfillment handler and relies on information from the vendor 116 on completed product delivery 210. The onus is on the vendor to ensure that the delivery acknowledgment 214 is sent to the merchant 104, lest the vendor 116 be left open to the possibility of being vulnerable to excessive fulfillment requests. Business practice determines the number, if any, of fulfillment requests beyond those purchased that will be allowed.

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the claims that follow. In the method claims, reference characters are used for convenience of description only, and do not indicate a particular order for performing the method.

What is claimed is:

1. A computer-implemented method for controlling delivery of digital products to users, the method comprising:
   receiving, at a first computer system, an order placed by a user for a digital product;
   in response to processing the order, transmitting a link from the first computer system to a user computer associated with the user, said link being selectable by the user to initiate electronic delivery of the digital product from a second computer system in fulfillment of the order while remaining anonymous to the second computer system, said second computer system programmed to notify the first computer system when the digital product is delivered to the user; and
   when the user accesses said link, determining, at said first computer system, whether the second computer system has already delivered the digital product to the user in fulfillment of the order;
   wherein the first computer system has access to personal information of the user, and enables the user to obtain the digital work from the second computer system without exposure of said personal information to the second computer system.

2. The method of claim 1, wherein the first computer system is operated by a merchant that collects payment for the digital product.

3. The method of claim 2, wherein the second computer system is operated by a vendor that is separate from the merchant.

4. The method of claim 1, wherein the first and second computer systems are operated by first and second business entities, respectively, and the method is performed such that the user remains anonymous to the second business entity.

5. The method of claim 1, further comprising, via the first computer system, blocking the user from obtaining delivery of the digital product via said link if the second computer system has already delivered the digital product to the user a threshold number of times.

6. The method of claim 5, wherein the threshold is one.

7. The method of claim 5, wherein the threshold is greater than one.

8. The method of claim 1, wherein the first computer system authorizes or requests the second computer system to deliver the digital product to the user in response to selection of said link only if the second computer system has not already delivered the digital product to the user.

9. The method of claim 1, further comprising, without exposing any personal information of the user to the second computer system, communicating information to the second computer system to enable the second computer system to deliver the digital product to the user in fulfillment of the order.

10. The method of claim 1, wherein the method comprises the first computer system determining how many times the digital product has been delivered to the user in connection with the order.

11. The method of claim 1, further comprising, in response to receiving a notification from the second computer system that the digital product has been delivered to the user, updating a database of the first computer system to indicate that the order has been fulfilled.

12. The method of claim 1, wherein the link points to the first computer system.

13. The method of claim 12, wherein the method comprises the first computer system responding to user selection of said link by sending a fulfillment request to the second computer system.

14. The method of claim 13, wherein the fulfillment request identifies a computer of the user, but does not contain any personal information of the user.

15. The method of claim 1, wherein the link points to the second computer system.

16. The method of claim 15, wherein the method comprises the second computer system responding to user selection of said link by communicating with the first computer system to obtain delivery authorization.

17. The method of claim 1, wherein the second computer system is one of a plurality of vendor computer systems that interact with the first computer system to deliver digital products to users in accordance with said method, each vendor computer system being associated with a different respective vendor.

18. A first computer system comprising one or more physical servers, said first computer system programmed, via executable instructions stored in computer storage, to at least:
receive an order placed by a user for a digital product;
in response to processing the order, transmit a link from the first computer system to a user computer associated with the user, said link being selectable by the user to initiate electronic delivery of the digital product from a second computer system in fulfillment of the order while remaining anonymous to the second computer system;
determine, by communicating over a network with the second computer system, whether the second computer system has delivered the digital product to the user in fulfillment of the order; and
when the user accesses said link, determine, based at least partly on whether the second computer system has already delivered the digital product to the user, whether to authorize the second computer system to deliver the digital product to the user;
wherein the first computer system has access to personal information of the user, and enables the user to obtain the digital work from the second computer system without exposure of said personal information to the second computer system.

19. A system for delivering digital products to users, the system comprising:
a first computer system that receives and processes orders from users for digital products, said first computer system programmed to interact over a network with a second computer system that (1) delivers the digital products to the users in fulfillment of said orders, and (2) notifies the first computer system that particular orders have been fulfilled;
wherein the first computer system is responsive to an order placed by a user for a digital product by transmitting a link to the user, said link being selectable by the user to request delivery of the digital product from the second computer system;
wherein the first computer system determines, when the user selects said link, whether to authorize or cause the second computer system to deliver the digital product to the user based at least in part on whether the first computer system has already been notified by the second computer system that the order has been fulfilled;
wherein the first computer system has access to personal information of the user, and enables the user to obtain the digital work from the second computer system without exposure of said personal information to the second computer system, said first computer system thereby enabling the user to remain anonymous to the second computer system.

20. The system of claim 19, wherein the first and second computer systems are operated by first and second business entities, respectively.

21. The system of claim 19, wherein the first computer system, without exposing any personal information of the users to the second computer system, communicates information to the second computer system to enable the second computer system to deliver the digital products to the users in fulfillment of said orders.

22. The system of claim 19, wherein the first computer system determines whether to authorize or request the second computer system to deliver the digital product to the user based, at least in part, one whether the digital product has been delivered to the user a threshold number of times.

23. The system of claim 22, wherein the threshold is one.

24. The system of claim 22, wherein the threshold is greater than one.

25. The system of claim 19, wherein the first computer system is responsive to receiving a notification from the second computer system that the digital product has been delivered to the user by updating a database of the first computer system to mark the order as fulfilled.

26. The system of claim 19, wherein the link points to the first computer system.

27. The system of claim 26, wherein the first computer system responds to user selection of the link by determining whether to send a fulfillment request to the second computer system.

28. The system of claim 27, wherein the fulfillment request identifies a computer of the user, but does not contain any personal information of the user.

29. The system of claim 19, wherein the link points to the second computer system.

30. The system of claim 29, wherein the first computer system is programmed to provide delivery authorization to the second computer system in response to receiving a request from the second computer system.

31. The system of claim 19, in combination with the second computer system, wherein the second computer system is one of a plurality of vendor computer systems that interact with the first computer system to deliver digital products to the users, each vendor computer system being associated with a different respective vendor.

* * * * *